Figure 1:
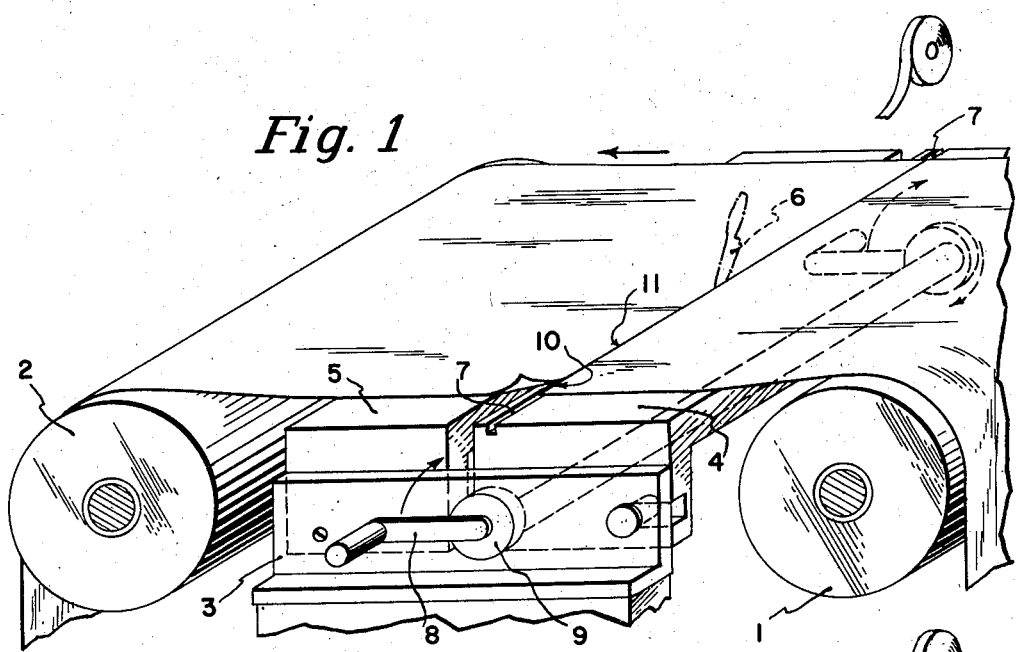

July 22, 1958     A. SUNNEN, JR     2,844,186
FILM SPLICING APPARATUS

Filed Sept. 30, 1954     2 Sheets-Sheet 1

INVENTOR
AUGUST SUNNEN, JR.

BY
ATTORNEY

July 22, 1958  A. SUNNEN, JR  2,844,186
FILM SPLICING APPARATUS
Filed Sept. 30, 1954  2 Sheets-Sheet 2

INVENTOR
AUGUST SUNNEN, JR.
BY
ATTORNEY

United States Patent Office 2,844,186
Patented July 22, 1958

2,844,186

FILM SPLICING APPARATUS

August Sunnen, Jr., London, Ontario, Canada, assignor to E. I. du Pont de Nemours and Company, Wilmington, Del., a corporation of Delaware Application September 30, 1954, Serial No. 459,308

3 Claims. (Cl. 154—42.2)

This invention relates to a film splicing apparatus. More particularly, it relates to an apparatus for splicing film on a slitting machine.

In the preparation of regenerated cellulose film and the like, wide rolls of semi-finished film (so-called mill rolls) are brought to the slitting machine to be slit into rolls of narrower width (so-called slit rolls). At times it becomes necessary to splice the end of one mill roll to the beginning of another mill roll in order to form complete slit rolls. Further, it may be necessary to cut out sections of a mill roll found undesirable due to improper size or surface imperfections and rejoin the ends prior to slitting. Cutting and splicing are performed manually. Two operators, using a mending board or stick as a guide, cut the film. Their skill and care is reflected in a straight, but rarely square, cut. Then the operators, while holding both film ends, splice the ends, determining the amount of overlap by eye. Consequently, film breaks during unwinding caused by exposed adhesive or weak splices and film wrinkles caused by skewed splices are not uncommon customer complaints.

The object of this invention is to avoid the above problems by providing a film splicing apparatus for making accurate splices. A further object is to enable a single operator to make accurate splices consistently. Other objects will appear hereinafter.

Briefly stated, the objects are accomplished by an apparatus comprising two adjacent plates, one movable and one stationary, adapted to support and hold film on their top surfaces; a slot in the movable plate transverse of the path of the film provides a guide for cutting the film; said movable plate is adapted to move a controlled distance toward and away from the stationary plate in conjunction with a downward then upward movement for accurate overlapping of the film ends prior to connecting the ends.

Figure 2:
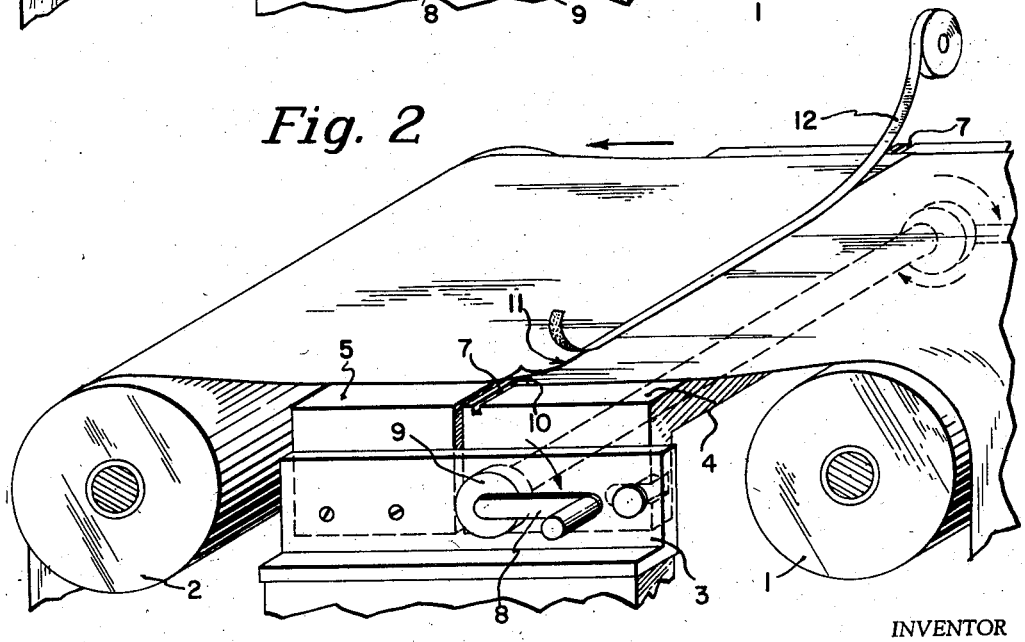
Figure 3:
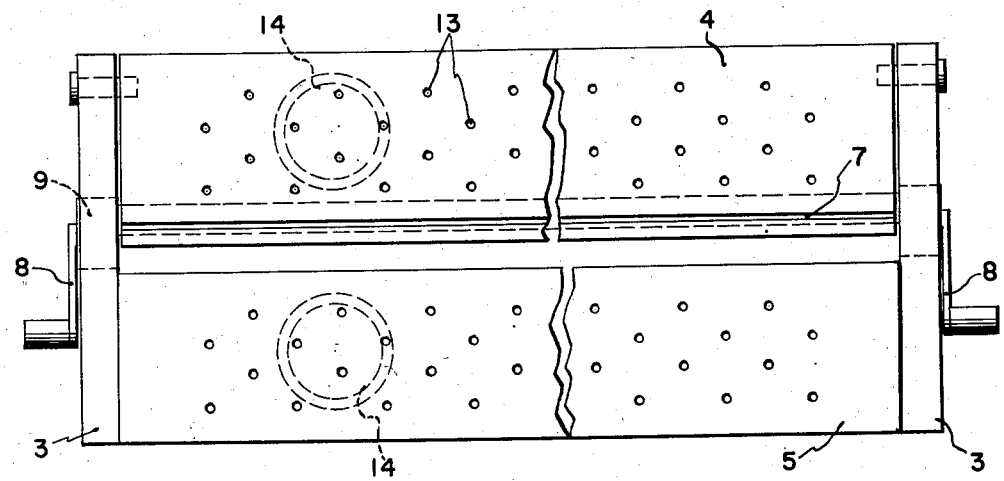
Figure 4:
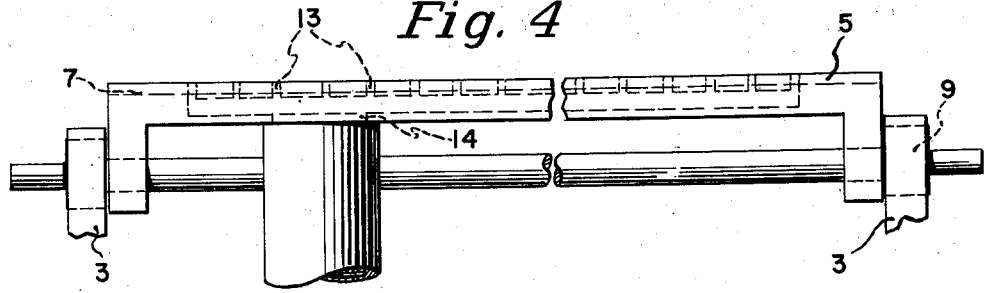

The invention will be more clearly understood by referring to the drawings which follow, in which:

Figure 1 is a perspective view of a preferred embodiment of this invention showing the plates in the open position, Figure 2 is a perspective view of a preferred embodiment of this invention showing the plates in the closed position, Figure 3 is a top view of a preferred embodiment of this invention, and Figure 4 is a side view of a preferred embodiment of this invention.

Referring to Figure 1, the film is passed from roll 1 to roll 2 and over the apparatus of the present invention interposed between the rolls. The apparatus comprises two plates 4 and 5 on a support 3. The top surfaces of the plates are in the same plane and their edges are approximately ⅜" apart. The tail of the first mill roll is held securely on the top surfaces of the plates. The operator, using a knife 6 or other cutting means, cuts the film using the slot 7 provided in the plate 4 as a guide. The leading edge of film from a second or new mill roll is brought up over plate 4 and past slot 7. The film is again held securely in position and cut. The two resulting film ends form a butt joint above the slot 7.

By means of the lever 8 and cam arrangement 9 the plate 4 is moved toward plate 5. Plate 4 is moved downwardly then upwardly so that the leading edge 10 of the film on plate 4 laps approximately ¼" underneath the edge 11 of the film clamped to plate 5. This position is shown in Figure 2 where the plates are approximately ⅛" apart. One inch wide pressure-sensitive tape 12 is applied over the overlapping joint to connect the two film ends. The amount of overlap and the tape width are arbitrarily selected and are not deemed limitative of this invention. The amount of overlap may be changed by changing the cam design.

A preferred method for holding the film securely to the plates involves suction and is illustrated in Figures 3 and 4. The plates 4 and 5 are made hollow, having a series of openings 13 on the top surface and a single opening 14 on the bottom surface. To the opening 14 is connected a flexible hose, which in turn is connected to an exhauster or vacuum pump. Applying a vacuum of about 30" of water serves to hold the film on the plates. Other methods such as bars, fingers, pressure plates and the like may also be used. However, they must be designed not to interfere with cutting and overlapping of the film, while holding the film securely to the supporting plates.

The splicer may be used for regenerated cellulose film, polyethylene film, polyethylene terephthalate film, etc., wherever accurate and consistently fine quality splices are desired. Splicing the film ends may be accomplished by using pressure-sensitive tapes or heat-sensitive tapes or adhesives in general.

The advantages of this apparatus are greatest when it is used in conjunction with a slitting machine. Film rolls as wide as 50" or wider can be spliced on this apparatus by a single operator. He can perform the job using the present invention in less time than two men could, using prior art methods. Furthermore, the splices are consistently good and independent of the operator's skill.

While a preferred embodiment has been shown, it is understood that changes and variations may be made without departing from the spirit and scope of the invention as defined by the appended claims.

I claim:

1. Film splicing apparatus comprising: a support; two adjacent plates attached to said support adapted to receive film on their top surfaces, one being a stationary plate affixed to said support, a second being a plate pivotally secured to said support; means for moving said second plate a controlled distance toward and away from the stationary plate, said means being further adapted to impart a downward then upward movement to the movable plate for accurate overlapping of the film ends; means for holding the film on the top surfaces of said two plates; and a slot in said movable plate transverse to the film to provide a guide for cutting the film.

2. Apparatus as in claim 1 wherein the means for holding the film to the top surfaces of said plates is suction means.

3. Apparatus as in claim 1 wherein said plates are hollow and have holes in the top surfaces through which a vacuum can be applied.

References Cited in the file of this patent

UNITED STATES PATENTS

| 1,175,449 | Hirsch | Mar. 14, 1916 |
| 1,781,200 | Spiros | Nov. 11, 1930 |
| 2,446,576 | De Vry | Aug. 10, 1948 |
| 2,460,619 | Briskin | Feb. 1, 1949 |
| 2,552,148 | Carson | May 8, 1951 |
| 2,664,139 | Speed et al. | Dec. 29, 1953 |